United States Patent
Voss-Wolff et al.

(10) Patent No.: US 11,924,266 B2
(45) Date of Patent: *Mar. 5, 2024

(54) LATENCY REDUCTION IN REMOTE RENDERING WITH ADAPTIVE PHASE SHIFTING

(71) Applicant: Microsoft Technology Licensing, LLC, Redmond, WA (US)

(72) Inventors: Christian Voss-Wolff, Sonnenbühl (DE); Florian Bagar, Eningen unter Achalm (DE); Dag Birger Frommhold, Metzingen (DE)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/589,280

(22) Filed: Jan. 31, 2022

(65) Prior Publication Data
US 2022/0232059 A1    Jul. 21, 2022

Related U.S. Application Data

(63) Continuation of application No. 16/459,129, filed on Jul. 1, 2019, now Pat. No. 11,240,285.

(51) Int. Cl.
*H04L 65/80* (2022.01)
*H04L 43/087* (2022.01)
*H04L 47/25* (2022.01)
*H04L 65/61* (2022.01)

(52) U.S. Cl.
CPC .......... *H04L 65/80* (2013.01); *H04L 43/087* (2013.01); *H04L 47/25* (2013.01); *H04L 65/61* (2022.05)

(58) Field of Classification Search
CPC .......... H04L 5/00; H04L 5/0058; H04L 65/80
See application file for complete search history.

(56) References Cited

U.S. PATENT DOCUMENTS

| | | | |
|---|---|---|---|
| 6,928,473 B1 * | 8/2005 | Sundaram | H04L 43/087 709/224 |
| 11,064,387 B1 * | 7/2021 | Movshovich | H04N 13/194 |
| 2003/0177154 A1 * | 9/2003 | Vrancic | G06F 1/12 708/160 |
| 2014/0213193 A1 * | 7/2014 | Zhang | H04W 64/003 455/67.11 |

OTHER PUBLICATIONS

"Office Action Issued in European Patent Application No. 20732372. 6", dated May 10, 2023, 8 Pages. (MS# 406788-EP-EPT).

* cited by examiner

*Primary Examiner* — Sulaiman Nooristany
(74) *Attorney, Agent, or Firm* — Workman Nydegger (57) ABSTRACT

Sending streamed data packets from a producer to a consumer. A method includes, at a first entity, sending consumable data packets from the first entity to a second entity at a first consumable packet rate. The method further includes receiving a first phase delta from the second entity, wherein the first phase delta is computed from transmission jitter, computed from timing information in the consumable data packets. The method further includes sending from the first entity consumable data packets at a second consumable packet rate, the second consumable packet rate being dependent on the first phase delta.

13 Claims, 7 Drawing Sheets

At A Second Entity, Receive Consumable Data Packets From A First Entity At A First Consumable Packet Rate Compute Transmission Jitter Based On Timing Information In The Consumable Data Packets Compute A First Phase Delta Based On The Jitter, The First Phase Delta Defining Timing Differences Between When Consumable Data Packets Are Sent From The Second Entity Provide The First Phase Delta To The First Entity Receive From The First Entity Consumable Data Packets At A Second Consumable Packet Rate, The Second Consumable Packet Rate Being Dependent On The First Phase Delta

*FIG. 9*

LATENCY REDUCTION IN REMOTE RENDERING WITH ADAPTIVE PHASE SHIFTING

CROSS-REFERENCE TO RELATED APPLICATIONS

This application is a continuation of U.S. application Ser. No. 16/459,129, entitled "LATENCY REDUCTION IN REMOTE RENDERING WITH ADAPTIVE PHASE SHIFTING," which was filed on Jul. 1, 2019, and which will issue on Feb. 1, 2022, as U.S. Pat. No. 11,240,285, the contents of which are incorporated by reference herein in their entirety.

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing system's ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Some computing systems may use network interconnections to implement a technology referred to herein as remote rendering. In particular, compact and portable systems are being created which display rich visual content to users. For example, virtual reality headsets which display virtual objects to users and augmented reality headsets which superimpose rendered, virtual objects onto real world environments and objects are now available. Typically, these headsets and other such devices are limited in size and weight, which results in limitations to the computing functionality that can be performed by the devices. Nonetheless, it is desirable that these devices be able to output complex images such as various views of 3D models.

Additionally, the images output by these devices is often dependent on user input at the devices. For example, in the context of virtual reality and augmented reality headset devices, a user may wear the headset device and then move spatially in a physical environment. The position of the user in the physical environment determines what image should be output on the device. For example, consider a case where a user is viewing a virtual 3D object. The 3D object can be placed in a stationary location. As the user moves the headset device about the 3D object, the view of the 3D object should change on the headset device. Alternatively or additionally, a user may be able to manipulate the 3D object to move the 3D object while the user remains somewhat stationary. This too will change what should be output on the headset device.

Rendering views of 3D models can require an immense amount of computing functionality. However, as noted previously, devices on which the 3D models are viewed often have limited computing functionality.

To solve this problem, remote rendering has been implemented. In a remote rendering arrangement, a more powerful computer is connected to the limited power device. The limited power device sends telemetry information, such as position information, user inputs to manipulate 3D objects, or other such information to the more powerful computer. The more powerful computer then manipulates the 3D model to create a view, which is then returned to the limited power device.

As one might imagine, it is important that the interactions and displayed images occur in a perceived seamless fashion. To accomplish this, there are certain deadlines between when images are received from the more powerful computer so that they can be displayed to the user in a seemingly seamless fashion. Similarly, there are deadlines for the more powerful computer to receive telemetry data from the device.

However, data will often be received too early or too late to be useful. This can be due to transmission jitter such as variable network delays, differences between the device clock and the more powerful computer clock, or for other reasons. For example, video data is often sent at 60 Hz meaning that a new image or frame is sent in a frame packet from the more powerful computer every 16.6 milliseconds. Similarly, telemetry data is sent from the device to the more powerful computer at the same rate, i.e. 60 Hz with one packet of telemetry data being sent every 16.6 milliseconds. Consider a case where there is a latency jitter in the network such that the latency for data being sent from the more powerful computer to the device changes over time. For example, at one point in time, the latency for a video packet to be sent from the more powerful computer to the device is 25 milliseconds. At a different time, the latency for a video packet to be sent from the more powerful computer to the device is 30 milliseconds. This changing latency (i.e., latency jitter) causes video packets to arrive too late to be used for rendering at the device, and/or multiple video packets will arrive close together resulting in one of the packets being discarded and the other packet used for rendering at the device. In either case, this results in dropped packets which are deleterious to the user experience at the device.

Therefore, it would be useful to implement a system that can more efficiently use streamed data packets and in particular data packets that are streamed in response to telemetry data, in the presence of network latency jitter, slight differences in system clocks, and for other reasons.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a computing environment. The method includes acts for sending streamed data packets from a producer to a consumer. The method includes, at a first entity, sending consumable data packets from the first entity to a second entity at a first consumable packet rate. The method further includes receiving a first phase delta from the second entity, wherein the first phase delta is computed from transmission jitter, computed from timing information in the consumable data packets. The method further includes sending from the first entity consumable data packets at a second consumable packet rate, the second consumable packet rate being dependent on the first phase delta.

Another method that may be practiced in a computing environment includes acts for receiving streamed data packets from a producer to a consumer. The data packets are dependent on state from the consumer. The method includes at a second entity, receiving consumable data packets from a first entity at a first consumable packet rate. The method further includes computing transmission jitter based on timing information in the consumable data packets. The method further includes computing a first phase delta based on the jitter, the first phase delta defining timing differences between when consumable data packets are sent from the second entity. The method further includes providing the first phase delta to the first entity. The method further includes receiving from the first entity consumable data packets at a second consumable packet rate, the second consumable packet rate being dependent on the first phase delta.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments illustrated herein are directed to a remote rendering system that is able to dynamically determine dynamically changing transmission jitter over time for transmitted data packets. The remote rendering system can compute a dynamically changing "phase" delta between a transmitted signal from a producer of data transmitting a stream of data packets as compared to a received signal of the stream of the data packets received by a consumer of data. As used herein the phase delta is the time difference between when packets are sent by a producer and when they are received by a consumer. This time difference can be in terms of actual time, percent of time it takes to transmit a packet from the producer to a consumer, percent of time between the start of two adjacent packets, or other relevant time. The phase delta can be provided to the producer, which can then adjust the frequency of the transmitted signal. For example, if the transmitted signal is a signal of video packets being transmitted at 60 packets per second, the producer may use the received phase information to either slightly raise or lower the packet rate to 61 packets per second or 59 packets per second (or some other rate as determined by the phase delta) to cause the data packets to be received in the received signal at a rate that allows the video packets to be used efficiently. Thus, there exists a technical problem whereby extra latency is introduced to a consuming system when data packets from a consuming system arrive too soon or too late. This problem can be solved by a technical means of evaluating phase shifts and adjusting data packet transmission frequency by adjusting the rate at which data packets are sent by a producing system.

Figure 1:
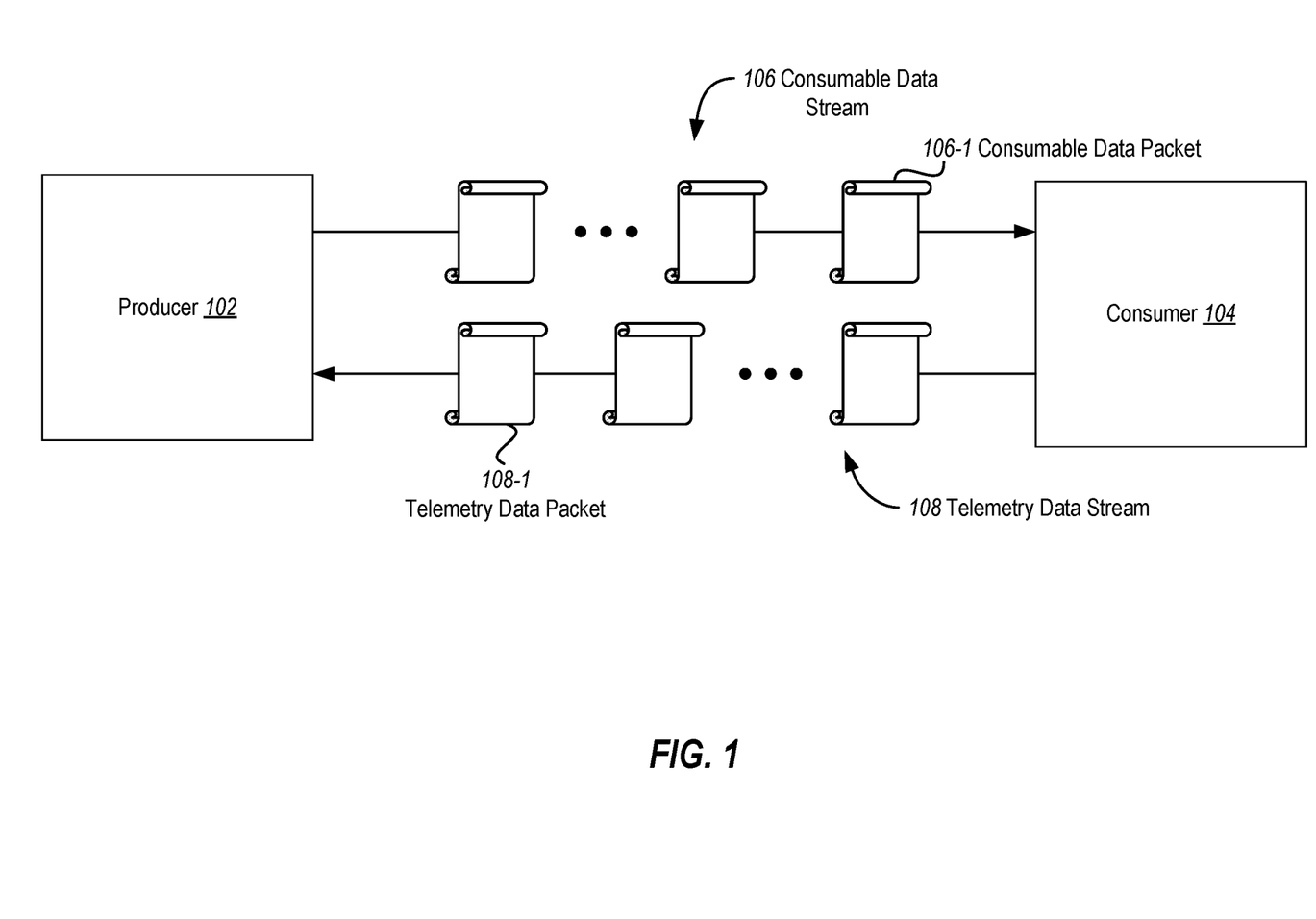
FIG. 1 illustrates sending consumable data from a producer to a consumer.

Referring now to FIG. 1, an example is illustrated. FIG. 1 illustrates a producer 102 and a consumer 104. The producer 102 produces a consumable data stream 106. The consumable data stream 106 comprises a number of data packets. For example, in the examples illustrated herein, the producer 102 may be a powerful computer configured to render images from a 3D model based on telemetry data from the consumer 104, and to transmit the images to the consumer 104. Thus, in the illustrated example, the consumable data stream 106 may include a number of video packets. FIG. 1 also illustrates that the consumer 104 sends a telemetry data stream 108 to the producer 102. The telemetry data stream 108 includes telemetry data produced by the consumer 104.

For example, such telemetry data may include position data for the consumer 104, user input at the consumer 104, or other data that can be used to determine what data should be included in the consumable data stream 106. For example, consider that the consumer sends a telemetry data packet 108-1. The data contained in the telemetry data packet 108-1, which may be for example, data indicating a user's absolute position, data indicating movement of a user, data indicating user input at a user interface, etc., is used by the producer 102 to generate a consumable data packet 106-1, such as a video frame. Thus, in the example illustrated in FIG. 1, the producer 102 streams consumable data packets in the consumable data stream 106 in response to the telemetry data packets in the telemetry data stream 108.

Note that typically the packet rate of the consumable data stream 106 is therefore the same packet rate as the telemetry data stream 108. For example, in the 3D video rendering, the consumable data stream 106 will typically be transmitted at 60 Hz. Similarly, the telemetry data stream 108 will be transmitted by the consumer 104 to the producer 102 at 60 Hz. As noted previously, transmission jitter may vary the rate at which producer 102 sends the consumable data stream 106 and at which the consumer 104 receives the consumable data stream 106. For example, the consumable data stream 106 is sent on some form of network. That network may be a wide area network, the Internet, a local area network, a Wi-Fi connection, a Bluetooth connection, or any other network medium, or combinations thereof. That particular network may have certain latency associated with the network. That is, it takes a finite amount of time for a particular consumable data packet to travel from the producer 102 through the network to the consumer 104. Additionally, that latency may change over time. Thus, over time, the packet rate at which the consumable data stream 106 is sent by the producer 102 will be different at different times to the packet rate perceived by the consumer 104. As noted previously, this can result in dropped packets and other problems that degrade the user experience. Examples are now illustrated with references to FIGS. 2-4.

As noted previously, remote rendering is used to overcome thermal and performance limitations in power-constrained devices, such as mobile phones or un-tethered augmented reality and virtual reality headset devices. In this context, a computationally heavy rendering operation is performed in a remote machine (the server or host) periodically and is transmitted over the network to another device, the client or player, for display. This operation is repeated multiples times per second to achieve a target packet rate.

Figure 2:
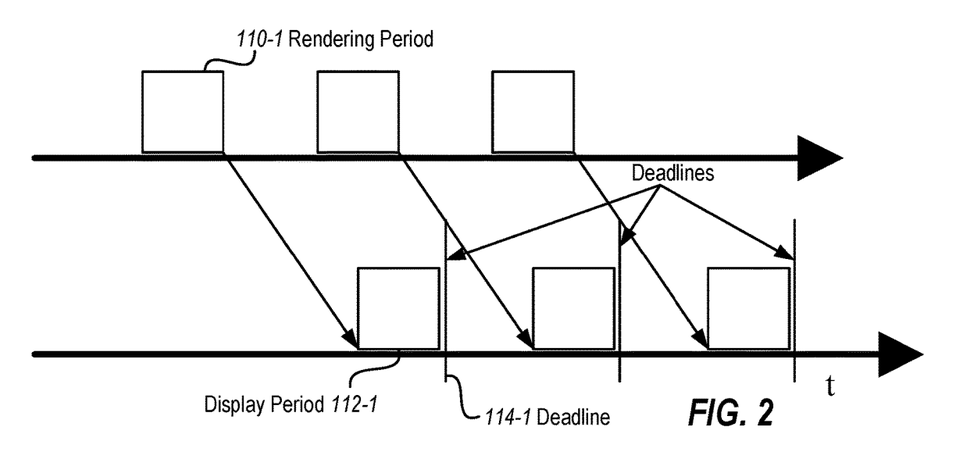
FIG. 2 illustrates an ideal phase delta for sending consumable data from a producer to a consumer.
Figure 3:
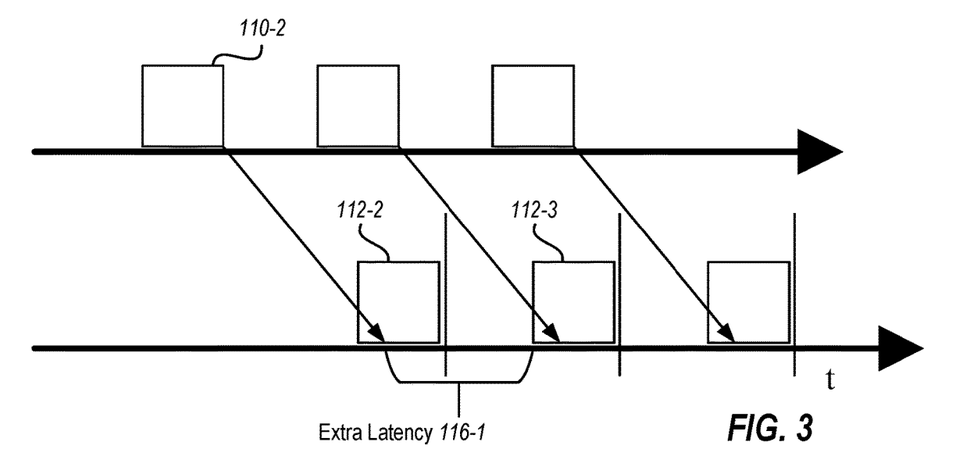
FIG. 3 illustrates a phase delta that is too large resulting in extra latency.
Figure 4:
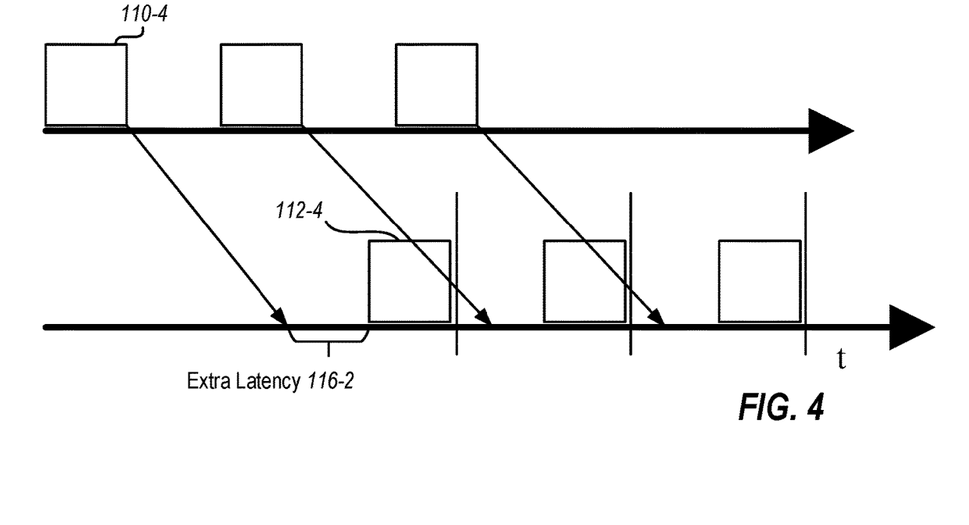
FIG. 4 illustrates a phase delta that is too small resulting in extra latency.

Even if the network is fast enough to send the information at the required rate, the whole process is sensitive to when exactly the received information is ready to be consumed, as shown in FIGS. 2, 3 and 4.

FIG. 2 illustrates an ideal phase delta between the producer and the consumer. In this example, packets are created during rendering periods. For example, a packet is created during the rendering period 110-1 and sent from the producer to the consumer. At the consumer, a certain display period is needed to display the image created from the data in the packet at the consumer. Thus, in the example, illustrated, the packet created during the rendering period 110-1 arrives slightly before it is needed for processing during the display period 112-1 to make the deadline 114-1.

FIG. 3 illustrates a non-ideal phase delta between the producer and the consumer. In this example, the packet created during the rendering period 110-2 arrives slightly after it is needed for processing by the display period 112-2. Thus, it is saved for the next display period 112-3 introducing the extra latency 116-1. Note that in the illustrated example, the rendering periods occur at a particular rate (e.g., 60 Hz) and the display periods occur at the same particular rate. If the frequency of the rendering periods would have been increased slightly, the packet produced by the rendering period 110-2 could have been used by the display period 112-2. Thus, embodiments may include functionality for identifying non-ideal phase deltas and adjusting the rate of the rendering periods, resulting in a corresponding adjustment to the packet rate for packets sent from the producer to the consumer. Note that the rate may be adjusted back down to the standard rate once deadlines are effectively being met.

FIG. 4 illustrates a non-ideal phase delta between the producer and the consumer where packets are arriving too early, introducing extra latency. In particular, the rendering period 110-4 produces and sends a packet that arrives earlier than desired at the consumer. Extra latency 116-2 is experienced while waiting for the display period 112-4 to display the image from the packet.

Note that this could be corrected by lowering slightly the frequency of the rendering periods, and therefore lowering the frequency of the packet rate of packets from the producer to the consumer. Note that the rate may be adjusted back up to the standard rate once deadlines are effectively being met.

Therefore, having an incorrect phase delta between the producer and the consumer introduces additional latency and micro-stuttering when the phase changes due to varying network conditions, or for other reasons.

Note that while the example illustrated in FIGS. 2-4 shows an ideal stream, a non-ideal stream due to packets arriving too late, and a non-ideal stream due to packets arriving too early, it should be appreciated that real world examples will include mixtures of the above. For example, network latency will typically have a mean latency. If data always arrived according to the mean latency, the embodiment illustrated in FIG. 2 could be implemented. However, this is not the case. Latency on the network will vary such that sometimes data will be transmitted more quickly across the network and sometimes data will be transmitted less quickly across the network. Thus, overtime, assuming that the rendering period rate is constant, a mixture of the various conditions illustrated in FIGS. 2, 3 and 4 will be experienced. However, embodiments illustrated herein attempt to vary the rendering period rate such that it is not constant, but rather varies slightly so as to attempt to achieve the example illustrated in FIG. 2, except with a varying rendering period rate.

Figure 5:
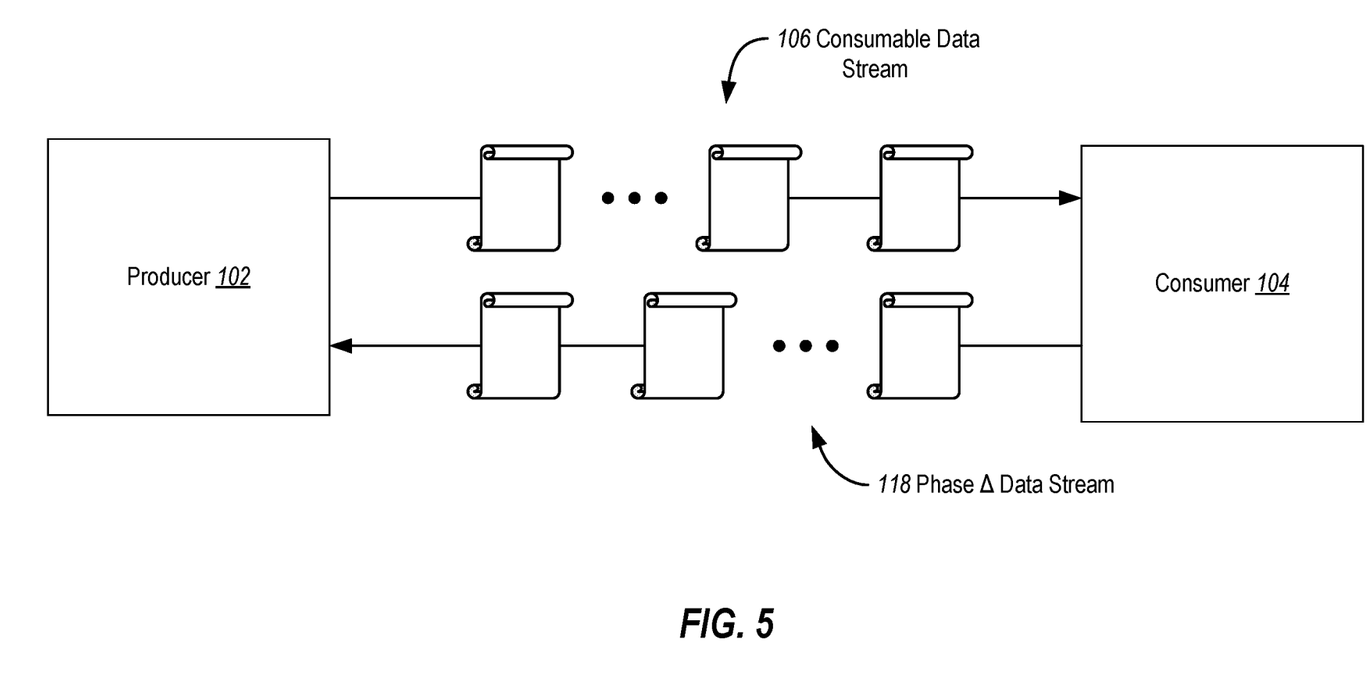
FIG. 5 illustrates sending consumable data from a producer to a consumer and phase delta information from a consumer to a producer.

Another example is illustrated in FIG. 5. FIG. 5 illustrates the producer 102 and the consumer 104. The consumable data stream 106, including a number of packets rendered by the producer 102, and to be consumed by the consumer 104 is sent from the producer 102 to the consumer 104. In the examples illustrated herein, the packets included in the consumable data stream may be video frame packets where each packet includes image data for a frame. The images are rendered at the producer 102. The data packets received by the consumer 104 include image data that can be displayed at the consumer 104. Note that the consumable data stream 106 has a packet rate which is variable. That is, the packet rate varies based on transmission latency.

Transmission latency may be caused by a number of different factors including network latency, varying clocks between the producer 102 and the consumer 104 (i.e., the timing clock at the producer 102 may have a slightly different frequency than the timing clock at the consumer 104, as a result of clock hardware different based on slight or more pronounced manufacturing differences, aging, heating up, etc., resulting in different data rates perceived by the producer 102 and the consumer 104 even when the data rates are constant between the two), or for other reasons. FIG. 5 also illustrates a phase delta data stream 118. The phase delta data stream 118 includes a number of data packets. The data packets in the phase delta data stream 118 include information from the perspective of the consumer 104 identifying the difference in phase between what the producer 102 perceives as the consumable data stream 106 and what the consumer 104 perceives as the consumable data stream 106. For example, the producer will send the consumable data stream 106 with various timestamps in the packets in the consumable data stream 106. The consumer 104 can then identify when packets were sent, which can be used to identify the frequency at which the packets are sent in the consumable data stream 106. The consumer 104 is also able to detect when packets are actually received at the consumer 104. Using this information, the consumer 104 can construct a phase delta describing the difference in phase between what the producer 102 perceives and what the consumer 104 perceives. Note that this phase delta will change over time due to the various factors described previously herein. Thus, the phase delta data stream 118 is a continuous data stream describing the changing phase deltas between what is perceived by the producer 102 and what is perceived by the consumer 104. The producer 102 can use the data in the packets of the phase delta data stream 118 to adjust the data rate of the consumable data stream 106. As noted previously, in some embodiments this may include adjusting the frequency of the rendering periods. Additional details are now illustrated.

In some embodiments, using a rolling window, the consumer 104 will keep track and/or collect statistics of the packet arrivals, in relation to the fixed deadlines. The use of a rolling window allows the system to adapt to changing transmission latency, such as changing network conditions. The optimal number of samples per window depends on the nature of the network. The larger the window, the longer it takes for statistics derived from the samples to change, and hence the longer it takes to react to a change in network conditions. One implementation uses a rolling window of 15 samples, meaning embodiments react within a timeframe of 250 ms (15*16.6 ms) to changing network conditions Based on the collected information and statistics, the consumer 104 computes a phase delta that attempts to minimize latency (where in this context, latency is defined as the difference between arrival time of a data packet and the beginning of processing of the data packet). For example, the computation can include computing the rate at which packets are sent by the producer 102 based on time stamps in the packets, the rate at which packets are received based on evaluating clock values at the consumer 104 when packets are received, and computing a difference between the rate that packets are sent as compared to the rate at which packets are received. For example, on each incoming packet at the consumer, the time difference between the arrival of the video packet and the corresponding following display period is computed (i.e., the 'extra latency' in FIGS. 2-4). This value is added to the window of samples. From the rolling window of these values, the median value is derived, which estimates the true phase difference between producer and consumer that one would see in the absence of network jitter. As network jitter delays packets, a temporary network jitter causes a spike in the latency sample values. These spikes are filtered out reliably by the median, which is not the case for taking a simple average. Additionally, a desired target value for the phase shift is determined. This may be hardcoded (e.g. 4 ms) or derived from the rolling window as a multiple of the standard deviation of the sample values. The producer packet rate is then adjusted to bring the median closer to this target value, speeding up the producer rate if the median is less than the target value, or slowing down the producer rate if the measured median is larger than the target value. That is, embodiments do not attempt to bring the median phase shift to 0, which would mean no extra latency, but rather to a specific value that increases the probability that a packet which behaves according to the latency distribution that was sampled to arrive before the display period. In effect, on a stable network, the rolling window of samples will have a low standard deviation, so the target value can be very small; whereas on a network with high amounts of jitter, the standard deviation will be higher. In this case, a small amount extra latency is desired to improve the chances of packets arriving in time even if they are delayed over the network.

Generally, embodiments can be formulated as an "optimization problem", which is a mathematics and computer science method of finding a best solution among many feasible solutions that minimizes latency. In some embodiments, the maximum latency may be minimized. Alternatively, the average latency may be minimized. Alternatively, the median latency may be minimized. Alternatively, the k-th percentile or similar metrics of time delay can be used. For example, in some embodiments, Instead of taking the standard deviation in the description above, other statistics derived from the distribution may be used as the target value. This is what the k-th percentile may be used for. That is, embodiments choose the target value such that k % of the samples in the rolling window would arrive before the display period. The best statistics depend heavily on the nature of the distribution, although observation has found that it tends to be very one-sided for typical networks, with most samples close to the median and a few spikes, instead of e.g. a bell curve.

The computed phase delta is sent periodically in the phase delta data stream 118 from the consumer 104 to the producer 102 over the network. Note that in some embodiments, this communication can be merged (piggy-backed) with other packets, to minimize network traffic. For example, in some embodiments, the telemetry data stream packets may include phase delta data as well as the telemetry data.

The producer 102 gradually and adaptively shifts wake-up times for hardware performing rendering negatively or positively based on the requested phase-delta by the consumer. The phase delta is performed gradually to avoid the creation of jittering and/or micro-stuttering.

In some embodiments, functionality may be implemented in a bidirectional fashion. In particular, an entity may be a consumer of certain data and a producer of other data. Such an entity may need to receive data in a fashion to meet certain deadlines at the entity and to produce and provide data for a different entity in a fashion to for the different entity to meet certain deadlines.

Figure 6:
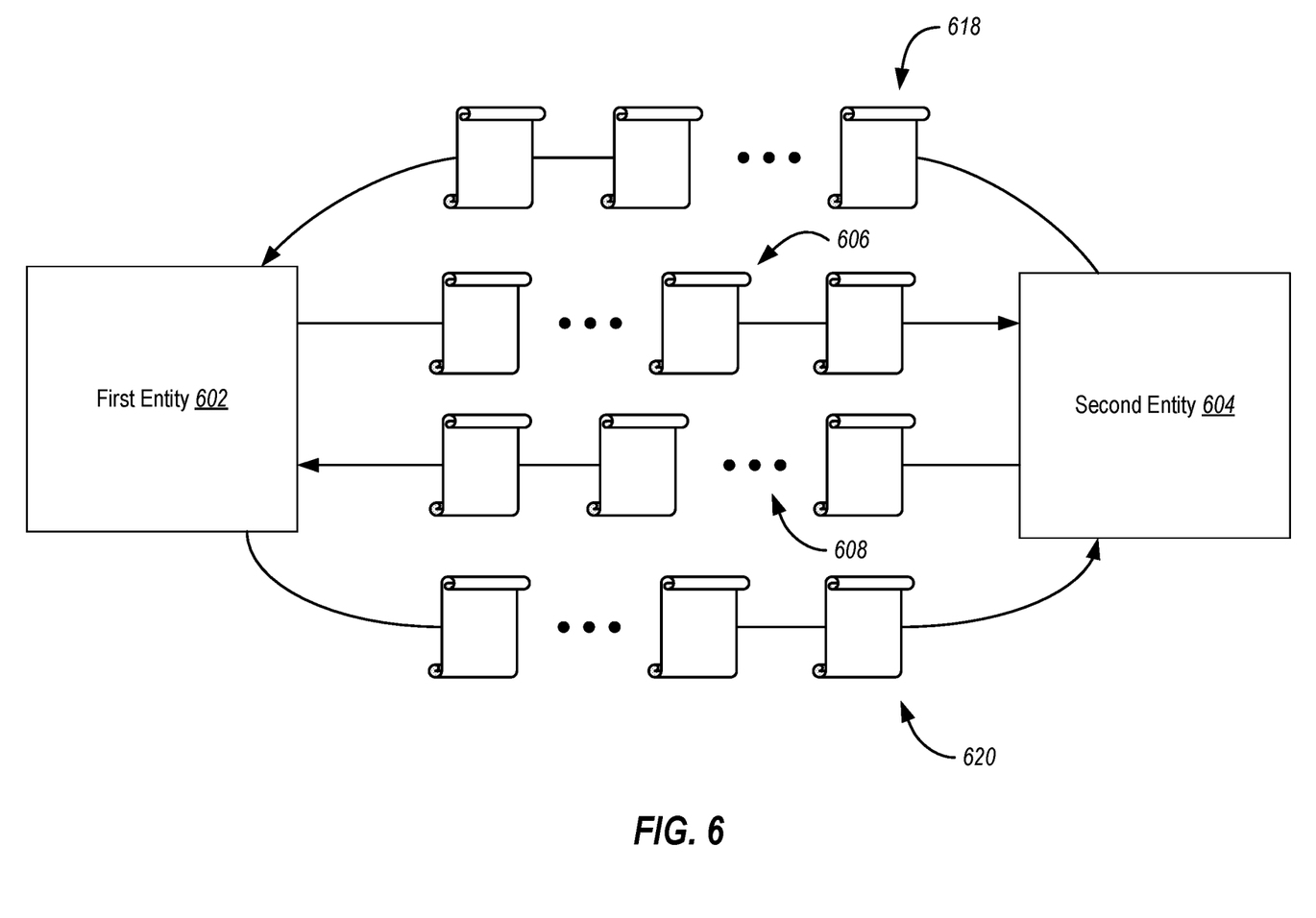
FIG. 6 illustrates sending consumable data from a first entity to a second entity, sending phase delta information from a second entity to a first entity, sending consumable data from the second entity to the first entity, and sending phase delta information from the first entity to the second entity.

For example, attention is now directed to FIG. 6 which illustrates a first entity 602 and a second entity 604. In this example, the first entity 602 produces and sends a consumable data stream 606 to a second entity 604. Similar to what is described above, the second entity 604 can provide a phase delta data stream 618 for the consumable data stream 606. This allows the first entity 602 to adjust the packet rate in the consumable data stream 606. This is done to ensure that packets arrive at the second entity 604 for the second entity to process those packets in a fashion that meets certain deadlines at the second entity 604.

However, the second entity 604 may send a form of "consumable data" to the first entity 602. In the present example, this data is illustrated as telemetry data, although it should be appreciated that other types of consumable data can be provided from the second entity 604 to the first entity 602. Thus, FIG. 6 illustrates a telemetry data stream 608. In the present example, the telemetry data stream 608 includes data packets with telemetry information about the second entity 604. These packets are sent in a consumable stream, i.e. the telemetry data stream 608, to the first entity 602 where they are consumed by the first entity 602. In the context of the examples illustrated herein, the first entity 602 may be a 3D model manipulation system that uses the telemetry data in the telemetry data stream 608 to produce video frames for video packets included in the consumable data stream 606.

The first entity 602 may send a phase delta data stream 620 for the telemetry data stream 608. In particular, the first entity 602 may have certain deadlines that need to be met at the first entity 602. To reduce latency, it may be desirable that those packets arrive at the first entity 602 in a particular fashion. As illustrated previously herein, the phase delta data stream 620 for the telemetry data stream 608 may identify a phase delta to the second entity 604 to allow the second entity 604 to adjust the packet rate of the telemetry data stream 608. Using the principles illustrated previously herein, this allows the first entity 602 to efficiently process packets from the telemetry data stream 108 to meet deadlines at the first entity 602.

As discussed previously, data streams and packets may be combined where appropriate. For example, phase delta data for the consumable data stream 606 may actually be included in the telemetry data stream 608. Similarly, phase delta data for the telemetry data stream 608 may actually be included in the consumable data stream 606. Thus, while FIG. 6 illustrates four separate data streams, it should be appreciated that similar functionality can be implemented with two data streams. Thus, for example, a packet in the telemetry data stream 608 may include telemetry data generated at the second entity 604 as well as phase delta data for a particular packet from the first entity 602 in the consumable data stream 606. Similarly, a packet in the consumable data stream 606 may include data for a video frame as well as phase delta data for a particular packet in the telemetry data stream 608. In this way, a need for having separate streams for the data shown in 618 and 620 is obviated.

Thus, in some embodiments in remote rendering, embodiments are able to decide the optimal point in time where the local client should sample the input information and send it to the rendering server. Alternatively or additionally, embodiments are able to decide the optimal point in time where the remote server will begin creating an image to be sent to the client.

Embodiments may be implemented to run continuously (and not only during communication handshake) to account for varying network conditions and for differences in the precision of the clocks in the server and client.

Figure 7:
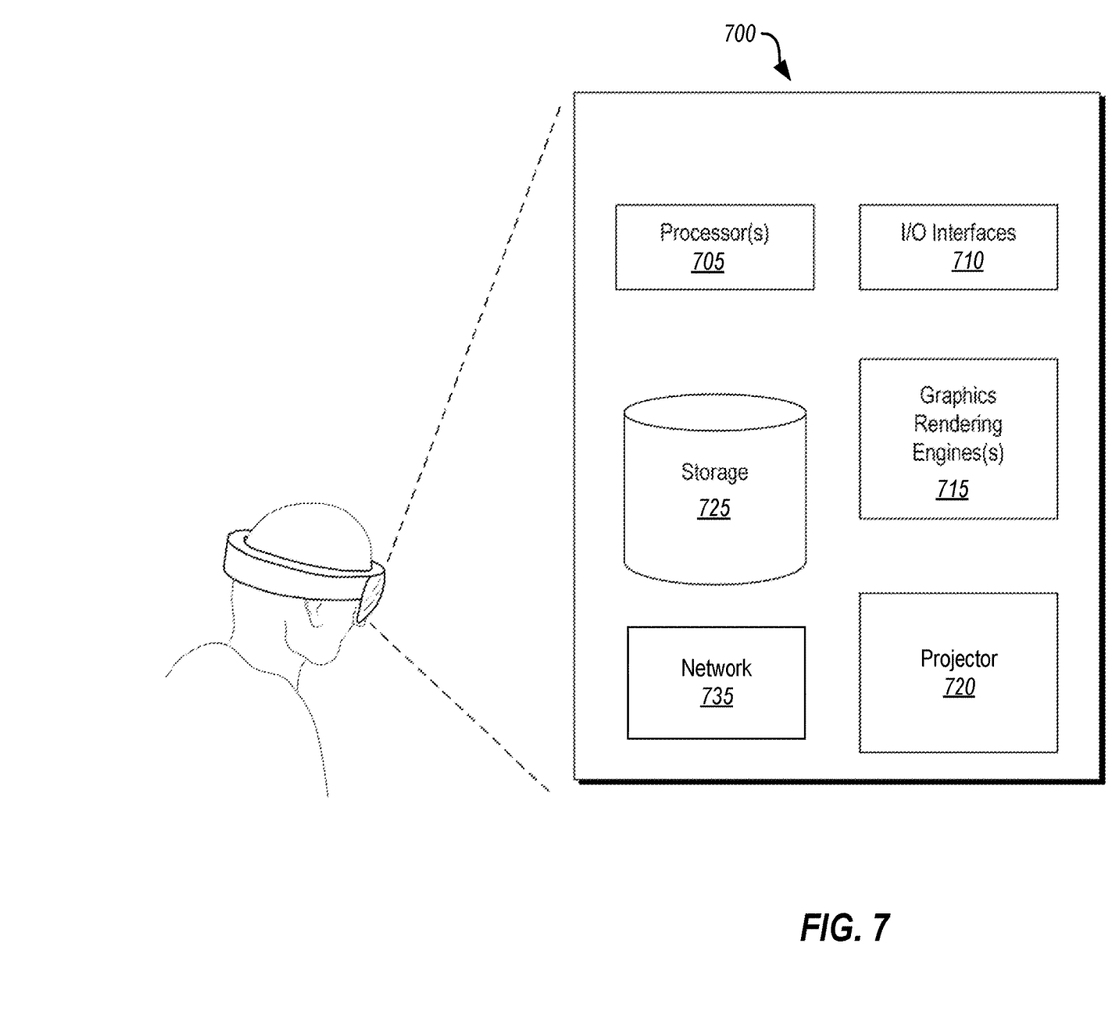
FIG. 7 illustrates a computing system where embodiments can be practiced.

Having just described the various features and functionalities of some of the disclosed embodiments, attention is now directed to FIG. 7, which illustrates an example computer system 700 that may be used to facilitate the operations described herein. It will be appreciated that, in some instances, aspects of the systems illustrated and the computer system 700 shown in FIG. 7 can be used in combination to carry out the embodiments described herein.

The computer system 700 may take various different forms. For example, in FIG. 7, the computer system 700 is shown as including a head-mounted display (HMD). Although the computer system 700 may be, at least partially, embodied as a HMD, the computer system 700 may also be a distributed system that includes one or more connected computing components/devices that are in communication with the HMD. Accordingly, the computer system 700 may be embodied in any form and is not limited strictly to the depiction illustrated in FIG. 7. By way of example, the computer system 700 may include a projector, desktop computer, a laptop, a tablet, a mobile phone, server, data center and/or any other computer system. Indeed, in some embodiments, the computer system 700 includes a cloud service/device implemented as the first entity 602 illustrated in FIG. 6, and an HMD implemented as the second entity 604. Alternatively, the computer system could include a desktop or laptop device, implemented as the first entity 602 illustrated in FIG. 6, and an HMD implemented as the second entity 604. Alternatively or additionally, the computer system 700 could include a specialized GPU hardware/device, a gaming console/device, or combinations thereof as the first entity 602 illustrated in FIG. 6, and an HMD implemented as the second entity 604. Alternatively, the second entity could be some other type of device other than an HMD, such as some other lower powered portable device.

In its most basic configuration, the computer system 700 includes various different components. For example, FIG. 7 shows that computer system 700 includes at least one hardware processing unit 705 (aka a "processor"), input/output (I/O) interfaces 710, graphics rendering engines 715, a projector 720, and storage 725. More detail on the hardware processing unit 705 will be presented momentarily. Note that the hardware can be implemented on either or both the first entity 602 and the second entity 604. Note further that the claims herein are not necessarily directed to the entire system 700, but may be directed to only portions of the system 700. For example, while the first entity and the second entity work in concert to implement the system 700, those different entities may be implemented as each their own systems, by each their own providers, and thus, the claimed embodiments herein may be directed to either or both portions of the system as appropriate. Thus, while individual components are described below, those components may be implemented as multiple actual components implemented in different physical forms on different portions of the system 700.

The storage 725 may be physical system memory, which may be volatile, non-volatile, or some combination of the two. The term "memory" may also be used herein to refer to non-volatile mass storage such as physical storage media. If the computer system 700 is distributed, the processing, memory, and/or storage capability may be distributed as well. Thus, for example, memory may be implemented at a producer and different memory implemented at the consumer, while both memories are included in the storage 725. As used herein, the term "executable module," "executable component," or even "component" can refer to software objects, routines, or methods that may be executed on the computer system 700. The different components, modules, engines, and services described herein may be implemented as objects or processors that execute on the computer system 700 (e.g. as separate threads).

The disclosed embodiments may comprise or utilize a special-purpose or general-purpose computer including computer hardware, such as, for example, one or more processors (such as the hardware processing unit 705) and system memory (such as storage 725), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example and not limitation, the current embodiments can comprise at least two distinctly different kinds of computer-readable media: computer storage media and transmission media.

Computer storage media are hardware storage devices, such as RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

The computer system 700 may also be connected (via a wired or wireless connection) to external sensors (e.g., one or more remote cameras, accelerometers, gyroscopes, acoustic sensors, magnetometers, etc.). It will be appreciated that the external sensors include sensor systems (e.g., a sensor system including a light emitter and camera), rather than solely individual sensor apparatuses. Further, the computer system 700 may also be connected through one or more wired or wireless networks to remote systems(s) that are configured to perform any of the processing described with regard to computer system 700.

During use, a user of the computer system 700 is able to perceive information (e.g., a mixed-reality environment) through a display screen that is included among the I/O interface(s) 710 and the projector 720 that is visible to the user. The I/O interface(s) 710 may include the input elements described herein, which are linked to one or more underlying applications.

The I/O interface(s) 710 and sensors may also include gesture detection devices, eye trackers, and/or other movement detecting components (e.g., cameras, gyroscopes, accelerometers, magnetometers, acoustic sensors, global positioning systems ("GPS," etc.) that are able to detect positioning and movement of one or more real-world objects, such as a user's hand, a stylus, and/or any other object(s) that the user may interact with while being immersed in the scene. This information may be provided as telemetry data as described above.

The graphics rendering engine 715 is configured, with the hardware processing unit 705 and the projector 720, to render one or more virtual objects within the scene. As a result, the virtual objects accurately move in response to a movement of the user and/or in response to user input as the user interacts within the virtual scene.

A "network," is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. The computer system 700 will include one or more communication channels that are used to communicate with the network 735. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

Additionally, or alternatively, the functionality described herein can be performed, at least in part, by one or more hardware logic components (e.g., the hardware processing unit 705). For example, and without limitation, illustrative types of hardware logic components that can be used include Field-Programmable Gate Arrays (FPGAs), Application-Specific Integrated Circuits (ASICs), Application-Specific Standard Products (ASSPs), System-On-A-Chip Systems (SOCs), Complex Programmable Logic Devices (CPLDs), Central Processing Units (CPUs), and other types of programmable hardware.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 8:
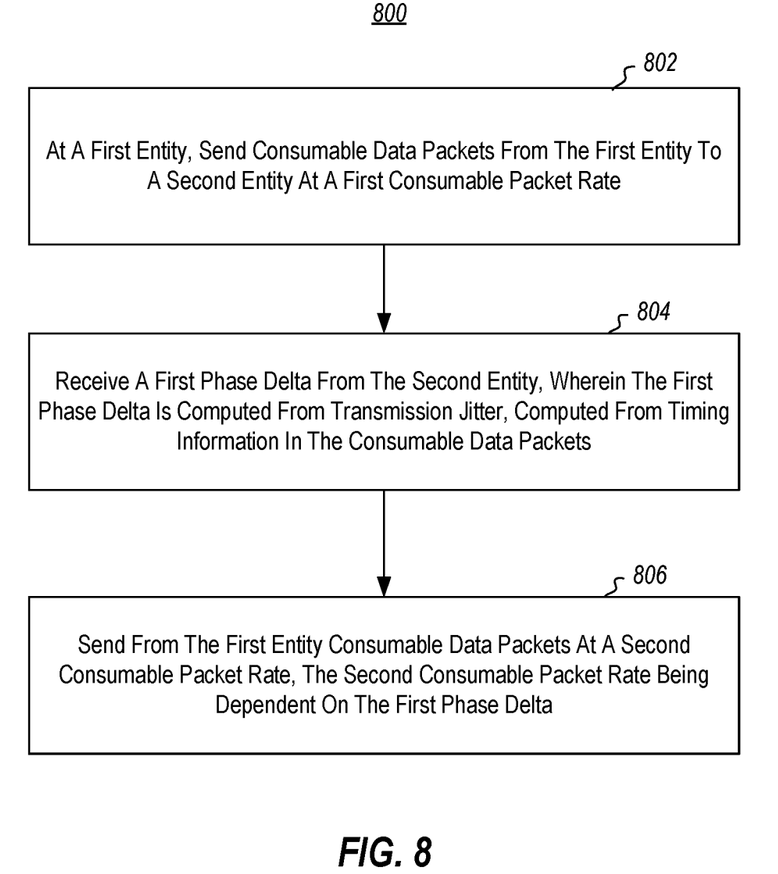
FIG. 8 illustrates a method of sending consumable data.

Referring now to FIG. 8, a method 800 is illustrated. The method 800 may be practiced in a computing environment, and includes acts for sending streamed data packets from a producer to a consumer. The method includes, at a first entity, sending consumable data packets from the first entity to a second entity at a first consumable packet rate (act 802). For example, in FIG. 6, the entity 602 can send data packets to the second entity 604 in the data stream 606.

The method 800 further includes receiving a first phase delta from the second entity, wherein the first phase delta is computed from transmission jitter, computed from timing information in the consumable data packets (act 804). For example, phase delta information may be sent in the phase delta stream 618.

The method 800 further includes sending from the first entity consumable data packets at a second consumable packet rate, the second consumable packet rate being dependent on the first phase delta (act 806). For example, the first entity 602 may adjust the rate at which packets are sent in the stream 606.

The method 800 may be practiced where the data in the consumable data packets is dependent on state data of the second entity provided to the first entity. For example, in some embodiments, the consumable data packets are video packets, the second entity is a consumer of video packets, the first entity is a producer of video packets, and the state data comprises telemetry data. In an alternative embodiment, the state data is received as state data packets (e.g., in the telemetry data stream 608) at a first state data packet rate. In such embodiments, the method may further include sending feedback including a second phase delta to the second entity (e.g., in the phase delta stream 620). The second phase delta includes timing differences between when state data packets are sent from the second entity to the first entity. The method may further include receiving the state data packets at a second state data packet rate, the second state data packet rate being dependent on the second phase delta. For example, the packet rate of the stream 608 may be adjusted as appropriate.

In some embodiments, the first phase delta is received in a state data packet (e.g., in a packet in the data stream 608) and the second phase delta is sent in a consumable data packet (e.g., in a packet in the data stream 606).

In some embodiments, the consumable data packets are telemetry packets, the second entity is a consumer of telemetry packets, and the second entity is a producer of video packets.

In some embodiments, the acts of method 800 are performed iteratively, such that consumable packet rates vary over time as phase deltas vary.

Figure 9:
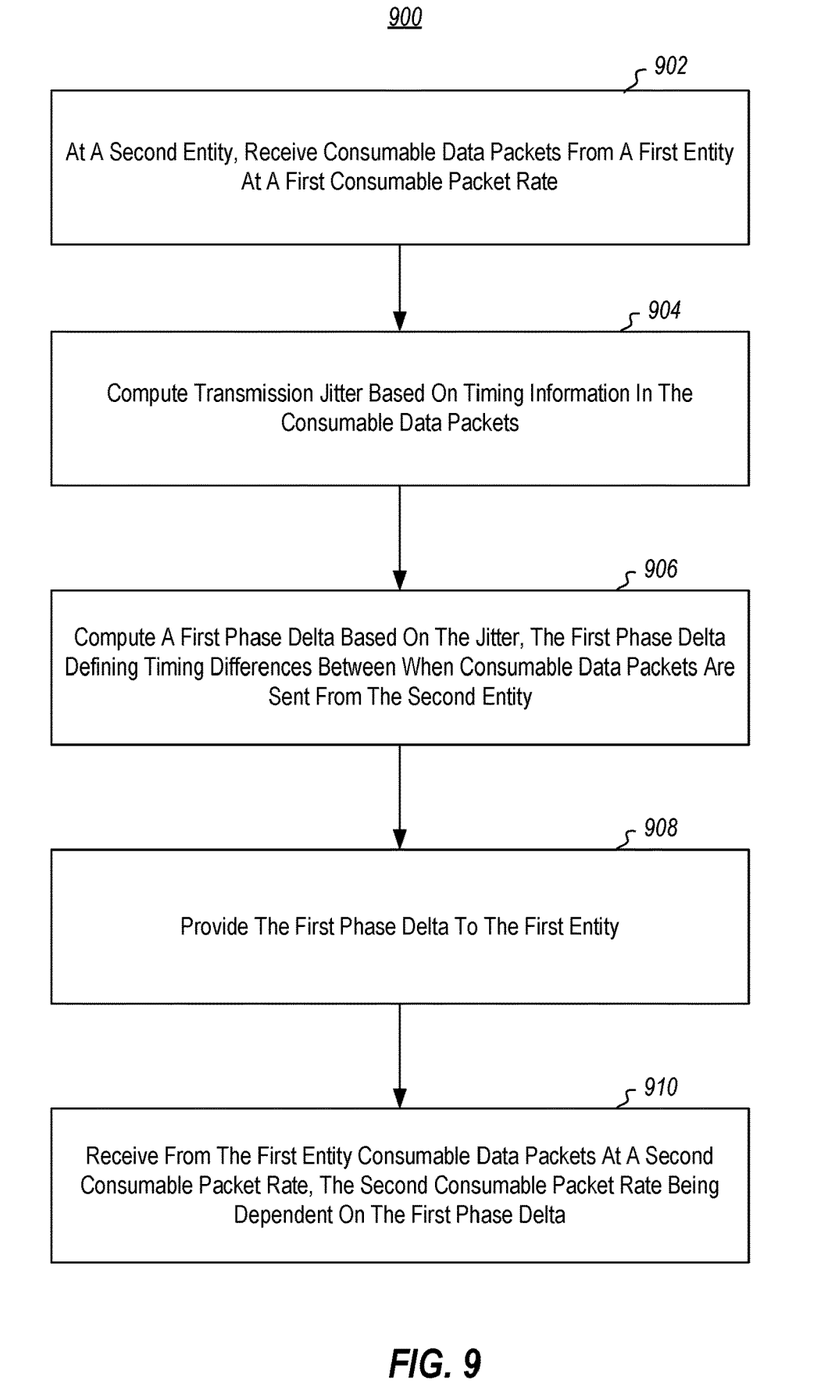
FIG. 9 illustrates a method of receiving consumable data.

Referring now to FIG. 9, a method 900 is illustrated. The method 900 may be practiced in a computing environment, and includes acts for receiving streamed data packets from a producer to a consumer, the data packets being dependent on state data from the consumer. The method 900 includes, at a second entity, receiving consumable data packets from a first entity at a first consumable packet rate (act 902). For example, the entity 604 may receive packets in the data stream 606 at a particular packet rate.

The method 900 further includes, computing transmission jitter based on timing information in the consumable data packets (act 904). For example, the second entity can use timing information in the data packets in the data stream, along with knowledge of when the data packets were received, to compute transmission jitter.

The method 900 further includes, computing a first phase delta based on the jitter, the first phase delta defining timing differences between when consumable data packets are sent from the second entity (act 906).

The method 900 further includes, providing the first phase delta to the first entity (act 908). For example, this phase delta information could be provided from the second entity 604 to the first entity 602 in the data stream 618.

The method 900 further includes, receiving from the first entity consumable data packets at a second consumable packet rate, the second consumable packet rate being dependent on the first phase delta (act 910). For example, the packet rate of the packets in the stream 606 are adjusted according to the phase delta information.

The method 900 may be practiced where the data in the consumable data packets is dependent on state data of the second entity provided to the first entity. For example, state data in the data stream 608 may be provided by the second entity 604 to the first entity 602, and used to generate the data in the data stream 606. In some such embodiments, the consumable data packets are video packets, the second entity is a consumer of video packets, the first entity is a producer of video packets, and the state data comprises telemetry data. Alternatively or additionally, in some such embodiments, the state data is sent as state data packets at a first state data packet rate. In such embodiments, the method may further include receiving feedback including a second phase delta from the first entity, the second phase delta comprising timing differences between when state data packets are sent from the second entity to the first entity; and sending the state data packets to the first entity at a second state data packet rate, the second state data packet rate being dependent on the second phase delta. Some such embodiments may be practiced where the first phase delta is sent in a state data packet (e.g., in packets in the data stream 608); and the second phase delta is received in a consumable data packet (e.g., in packets in the data stream 606).

In some embodiments of the method 900, the consumable data packets are telemetry packets, the second entity is a consumer of telemetry packets, and the second entity is a producer of video packets.

The method 900 may be practiced where the acts are performed iteratively, such that consumable packet rates vary over time as phase deltas vary.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices.

When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system enabled to send consumable data packets at variable packet rates based upon measured latency, the computer system comprising:
   one or more processors; and
   one or more computer-readable media having stored thereon instructions that are executable by the one or more processors to configure the computer system to send streamed data packets from a producer to a consumer, including instructions that are executable to configure the computer system to perform at least the following:
   at a first entity, send consumable data packets from the first entity to a second entity at a first consumable packet rate, each consumable data packet comprising a timestamp enabling the consumer to identify when the each consumable data packet had been sent by the first entity;
   receive a first phase delta from the second entity, the first phase delta being received in a state data packet, wherein the first phase delta is computed from transmission jitter, computed from timing information in the consumable data packets, including the included timestamps and information identifying when the each consumable data packet was received at the second entity, and the first phase delta being computed to decrease latency, the latency being a time difference between an arrival time of a packet and a display time of the packet;
   send from the first entity consumable data packets at a second consumable packet rate, the second consumable packet rate being dependent on the first phase delta; and
   send from the first entity at least one consumable data packet comprising a second phase delta associated with timing differences in received state data packets.

2. The computer system of claim 1, wherein the data in the consumable data packets is dependent on state data of the second entity provided to the first entity.

3. The computer system of claim 2, wherein the consumable data packets are video packets, the second entity is a consumer of video packets, the first entity is a producer of video packets, and the state data comprises telemetry data.

4. The computer system of claim 2, wherein the state data is received as state data packets at a first state data packet rate, and the instructions further include instructions that are executable by the one or more processors to configure the computer system to perform at least the following:
   receiving the state data packets at a second state data packet rate, the second state data packet rate being dependent on the second phase delta.

5. The computer system of claim 4, wherein:
   the second phase delta is sent in a consumable data packet.

6. The computer system of claim 1, wherein the consumable data packets are telemetry packets, the second entity is a consumer of telemetry packets, and the second entity is a producer of video packets.

7. In a computing environment, a method of sending consumable data packets from a producer to a consumer at variable packet rates based upon measured latency, the method comprising:
   at a first entity, sending consumable data packets from the first entity to a second entity at a first consumable packet rate, each consumable data packet comprising a timestamp enabling the consumer to identify when the each consumable data packet had been sent by the first entity;

receiving a first phase delta from the second entity, the first phase delta beings received in a state data packet, wherein the first phase delta is computed at least from transmission jitter, computed from timing information in the consumable data packets, including the included timestamps and information identifying when the each consumable data packet was received at the second entity, and the first phase delta being computed to decrease latency, the latency being a time difference between an arrival time of a packet and a display time of the packet;

computing a second consumable packet rate based upon the received first phase delta;

sending from the first entity consumable data packets at a second consumable packet rate, the second consumable packet rate being dependent on the first phase delta; and send from the first entity at least one consumable data packet comprising a second phase delta associated with timing differences in received state data packets.

8. The method of claim 7, wherein the data in the consumable data packets is dependent on state data of the second entity provided to the first entity.

9. The method of claim 8, wherein the consumable data packets are video packets, the second entity is a consumer of video packets, the first entity is a producer of video packets, and the state data comprises telemetry data.

10. The method of claim 8, wherein the state data is received as state data packets at a first state data packet rate, the method further comprising:

receiving the state data packets at a second state data packet rate, the second state data packet rate being dependent on the second phase delta.

11. The method of claim 10, wherein:

the second phase delta is sent in a consumable data packet.

12. The method of claim 7, wherein the consumable data packets are telemetry packets, the second entity is a consumer of telemetry packets, and the second entity is a producer of video packets.

13. The method of claim 7, wherein the acts are performed iteratively, such that consumable packet rates vary over time as phase deltas vary.

* * * * *